(12) United States Patent
Pieper et al.

(10) Patent No.: US 7,464,143 B2
(45) Date of Patent: Dec. 9, 2008

(54) DIGITAL OBJECT DELIVERY AND MANAGEMENT SYSTEM WITH DYNAMICALLY CREATED TEMPORARY FTP ACCESS CODES

(75) Inventors: Tobid Pieper, Orinda, CA (US); Paul Martinelli, Berkeley, CA (US); Brad Thompson, Danville, CA (US); James Brentano, Orinda, CA (US); Steven Loyd, Antioch, CA (US)

(73) Assignee: Intraware, Inc., Orinda, CA (US)

( * ) Notice: Subject to any disclaimer, the term of this patent is extended or adjusted under 35 U.S.C. 154(b) by 1190 days.

(21) Appl. No.: 10/693,085

(22) Filed: Oct. 24, 2003

(65) Prior Publication Data

US 2004/0088680 A1 May 6, 2004

Related U.S. Application Data

(60) Provisional application No. 60/421,279, filed on Oct. 25, 2002.

(51) Int. Cl.
*G06F 15/16* (2006.01)
*G06F 15/173* (2006.01)
(52) U.S. Cl. .................. 709/219; 709/225; 709/229
(58) Field of Classification Search .......... 709/219, 709/225, 229
See application file for complete search history.

(56) References Cited

U.S. PATENT DOCUMENTS 5,991,878 A * 11/1999 McDonough et al. .......... 726/9
6,078,929 A * 6/2000 Rao ........................... 707/200

* cited by examiner

*Primary Examiner*—Jason D Cardone
*Assistant Examiner*—Tanim Hossain
(74) *Attorney, Agent, or Firm*—Michael A. Glenn; Glenn Patent Group

(57) ABSTRACT

A digital object delivery/management system includes a library of stored digital objects and a shared database containing web server access codes and a mapping indicating which users are authorized to access which stored digital objects. The shared database is coupled to a file transfer protocol (FTP) server and a web server. The FTP server is additionally coupled to the library. The web server presents at least one web page providing instructions for users seeking access to digital objects contained in the library, authenticates users according to the web server access codes, generates temporary FTP access codes for use by authenticated users in accessing authorized objects at the FTP server, and redirects authenticated users to the FTP server. The FTP server authenticates users according to the temporary FTP access codes, and, upon successful authentication, makes digital objects contained in the library available to requesting users pursuant to the mapping.

25 Claims, 5 Drawing Sheets

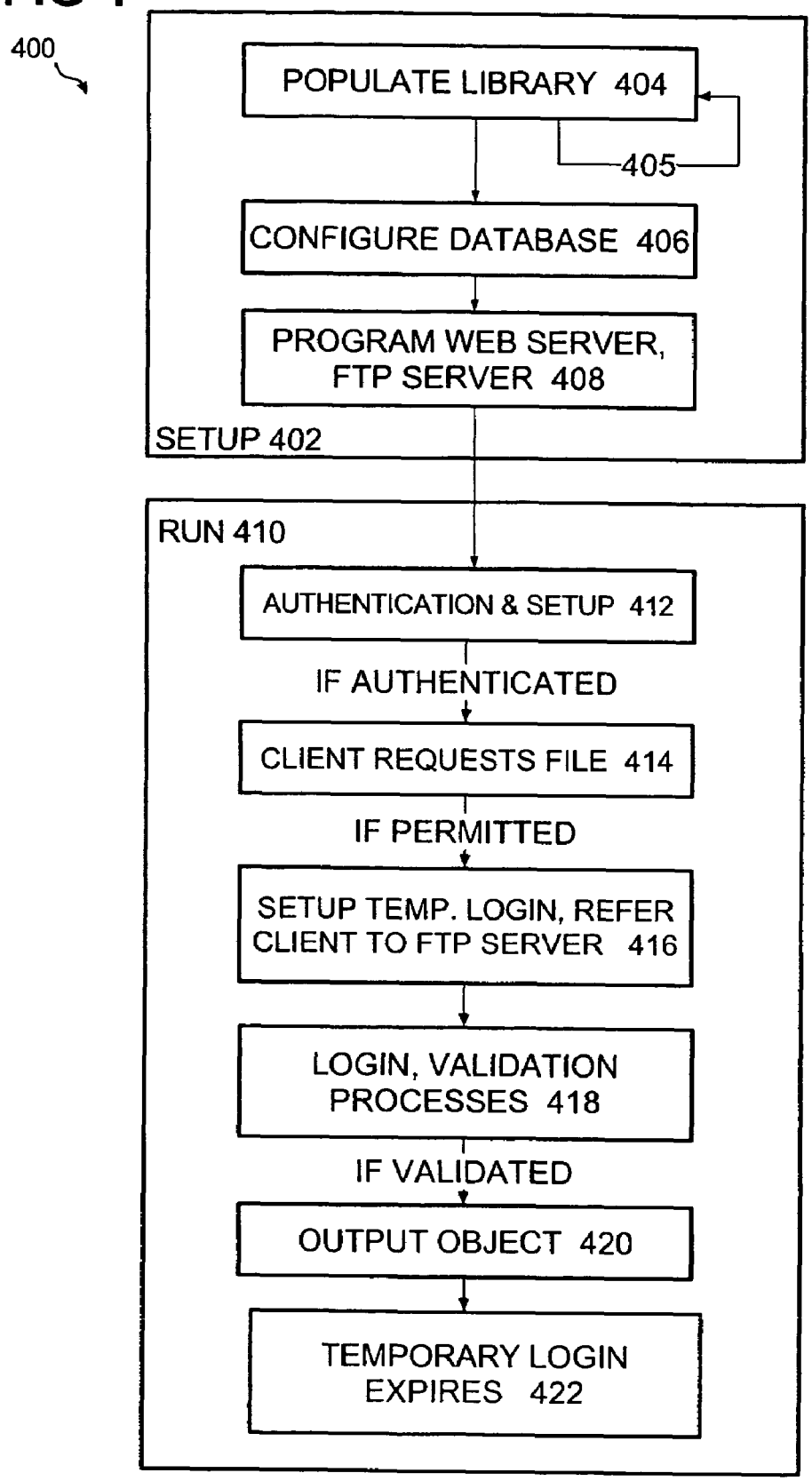

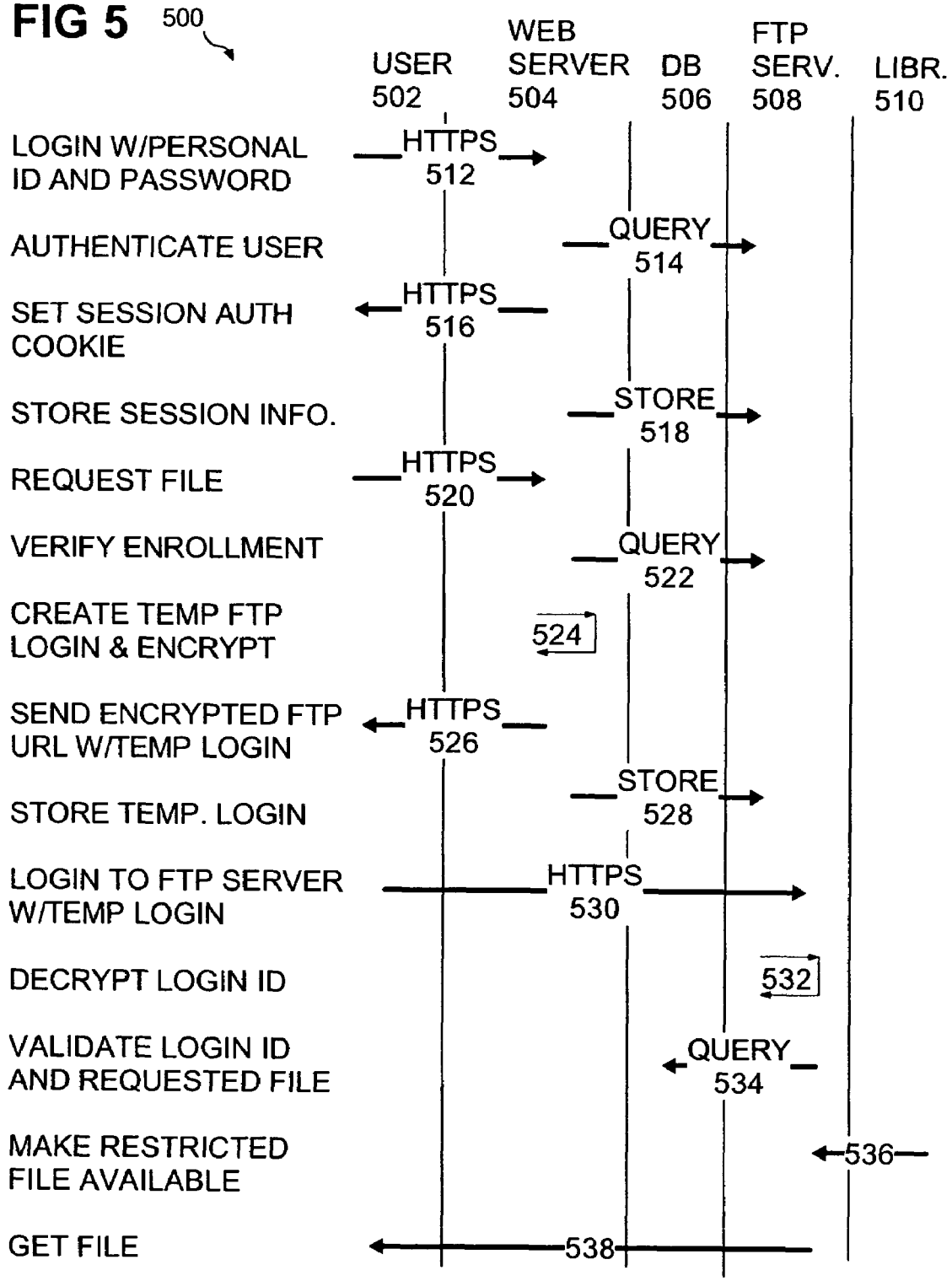

FIG 6    600

| DATABASE ENTRY COMPONENT | MEANING |
|---|---|
| ftp_req_id   602 (FTP Request ID) | The primary key of the record; an auto-incrementing value used to generate unique user ids for the FTP server. |
| img_key_id   604 (Image Key ID) | An internal database ID used to identify the file that is to be made available for download by the FTP server. |
| file_nm   606 (File Name) | Name of the file described by the img_key_id. |
| cre_dtm   608 (Create Date/Timestamp) | Used for audit purposes to track when the request record was created. |
| exp_dtm   610 (Expiration Date/ Timestamp) | Sets the time at which the request may no longer be used. Authentication requests after this point in time are denied. |
| ct_id   612 (Contact Identifier) | Unique identifier of the individual authorized to download. |
| party_id   614 (Party Identifier) | Unique identifier of the account of which the contact is a member. |
| encrypt_ind   616 (Encryption Indicator) | Indicates to the FTP server whether or not to deliver an encrypted version of the file. |
| dnld_id   618 (Download Identifier) | A reference to another database table used for managing the software entitlements available to individuals and their associated accounts. |
| pswd_val   620 (Password Value) | System generated password required for temporary FTP user represented by this database record. |

DIGITAL OBJECT DELIVERY AND MANAGEMENT SYSTEM WITH DYNAMICALLY CREATED TEMPORARY FTP ACCESS CODES

CROSS-REFERENCE TO RELATED APPLICATIONS

This application claims the benefit of one of more of the following earlier filed applications in accordance with one or more of 35 USC 119, 120, 365: U.S. Provisional Application No. 60/421,279 entitled "Dynamic Creation and Use of Temporary FTP User ID" filed on 25 Oct. 2002 in the names of Pieper et al. The entirety of the foregoing application(s) is hereby incorporated herein by reference

BACKGROUND OF THE INVENTION

1. Field of the Invention

The present invention relates to storage and delivery of digital data objects such as software. More particularly, the invention concerns a web-accessible digital data storage and delivery system that initially authenticates users seeking access to objects contained in a library, and further automatically generates temporary file transfer protocol (FTP) access codes to streamline users' access to desired objects via an FTP server. One aspect of the invention is a web-based application that allows users to locate and then download digital files such as software to which they are entitled or otherwise authorized.

2. Description of the Related Art

An electronic software delivery and management service (ESDM) must be able to manage access to a large repository of digital files from a wide range of users by restricting users to only download files to which they are entitled. FTP is the most common method of downloading large digital files across the Internet.

There are two basic modes for accessing FTP servers. The first is via a well known-user who has a unique user ID with a password. The second is via an anonymous user. In the well-known user mode, the user must be configured as a user in the underlying operating system. This mode is problematic in that it requires human intervention to manage those user accounts (including user setup, expiration, and removal) on the FTP server. In systems with millions of end users, the level of required human intervention could be astronomical in time and cost. The anonymous mode is problematic in that the user is not known and, therefore, cannot be restricted to the appropriate set of files that are relevant to that user.

A typical solution to the problem is to use the anonymous FTP mode and to place files in obscure and/or temporary locations on the FTP server that cannot be found via navigation through the file system directory hierarchy. This solution is inadequate on several fronts. First, because the user access mode is anonymous, files that the actual user should not be allowed to access are technically still available for download. A file's storage location is all the user would need to download the file. Second, the anonymous user ID cannot be expired. As a result, a devious user would have an unlimited amount of time to look for unauthorized files. It has been reported that some sites use temporary but anonymous accounts. In this method, the user is not known and all users in a given period have access to the same files, but users only have access for a limited time. Such systems still suffer from the first problem, namely, that files are still available to users that are not authorized to access such files.

SUMMARY OF THE INVENTION

Without any intended limitation, one illustrative embodiment of the present invention concerns a digital object delivery and management system. One component of the ESDM system is a library of stored digital objects. Another component is a shared database containing a web server access codes and a mapping indicating which users are authorized to access which stored digital objects. The shared database is coupled to a file transfer protocol (FTP) server and a web server. The FTP server is additionally coupled to the library. The web server presents at least one web page providing instructions for users seeking access to digital objects contained in the library, authenticates users according to the web server access codes, generates unique temporary FTP access codes for use by authenticated users in accessing authorized objects at the FTP server, and redirects authenticated users to the FTP server. The FTP server authenticates users according to the temporary FTP access codes, and, upon successful authentication, makes digital objects contained in the library available to requesting users pursuant to the mapping.

BRIEF DESCRIPTION OF THE DRAWINGS

FIG. 4 is a flowchart illustrating an exemplary sequence for operating the system of FIG. 1 to selectively deliver stored digital objects.

FIG. 5 is a data flow diagram illustrating in more detail an exemplary sequence for operating the system of FIG. 1 to selectively deliver stored digital objects.

FIG. 6 is a table illustrating one example of a portion of the database of FIG. 1.

DETAILED DESCRIPTION

The nature, objectives, and advantages of the invention will become more apparent to those skilled in the art after considering the following detailed description in connection with the accompanying drawings.

Hardware Components & Interconnections

Overall Structure

Figure 1:
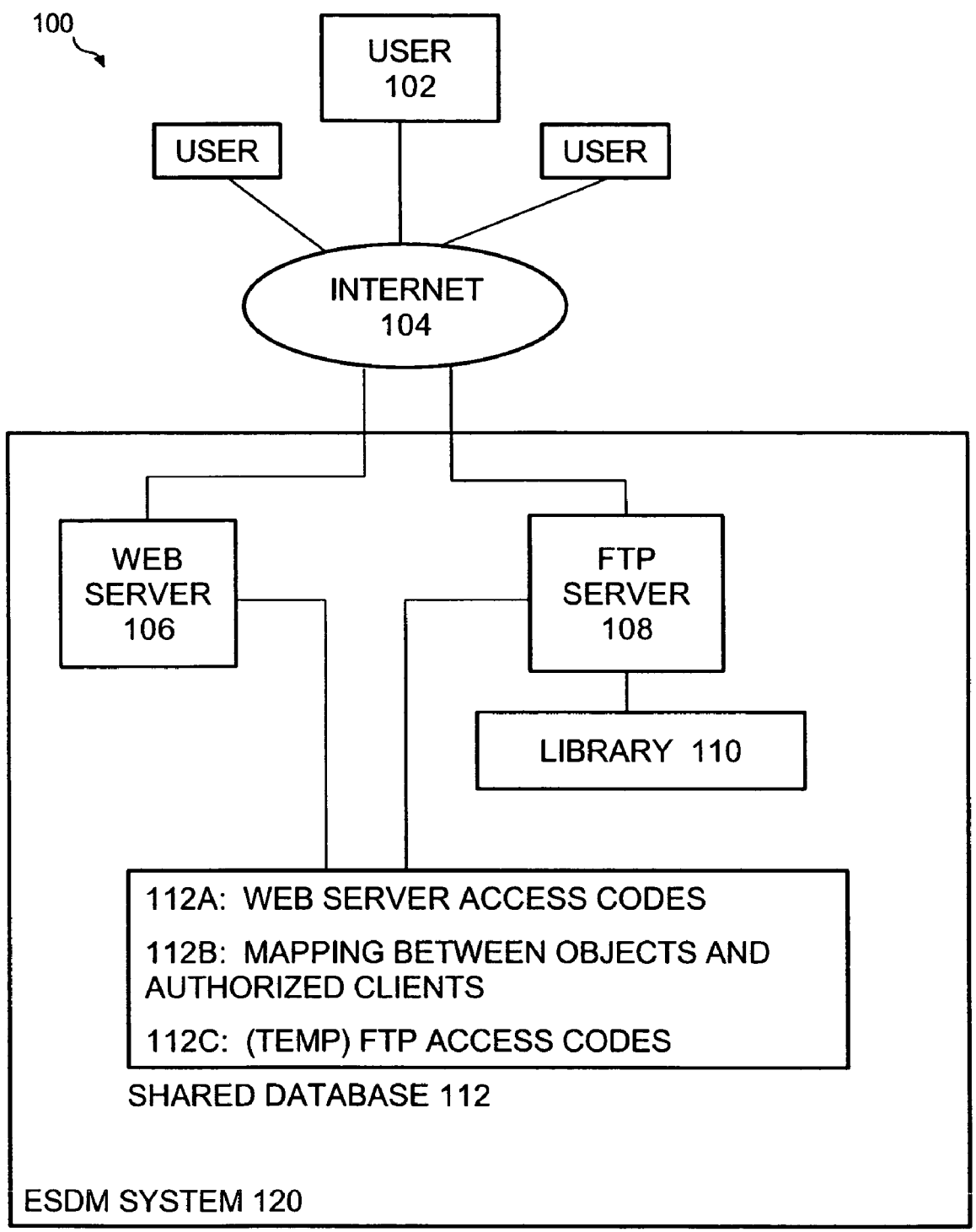
FIG. 1 is a block diagram of the hardware components and interconnections of an exemplary digital object storage and delivery system.

One aspect of the invention concerns an electronic software delivery and management (ESDM) system, which may be embodied by various hardware components and interconnections, with one example being described by the exemplary hardware environment 100 of FIG. 1. The system 100 includes various subcomponents, each of which may be implemented by one or more hardware devices, software devices, a portion of one or more hardware or software devices, or a combination of the foregoing. The makeup of these subcomponents is described in greater detail below, with reference to an exemplary digital data processing apparatus, logic circuit, and signal bearing medium.

Basically, the environment 100 as illustrated includes multiple users (exemplified by the user 102), the Internet 104, and an ESDM system 120. The user 102 may also be referred to as a "client." The user 102 comprises a person using a computing device with a web browser, which is used to communicate with the ESDM system 120. Communication between the user 102 and the ESDM system 120 occurs over the Internet 104, which comprises the public Internet as illustrated. The user 102 seeks access to digital objects stored in a library 110 (described below), having earlier subscribed to (or been entitled by the owner or developer of the digital objects) to ESDM services offered by an ESDM entity that operates the ESDM system 120.

Basically, the ESDM system 120 serves to manage discovery and delivery of digital objects from the library 110 to users (such as 102) that are authorized to receive such objects by subscription, contract, payment, or other arrangement. As a particular example, the ESDM system 120 may be implemented using the hardware structure (with various changes according to the present disclosure) used to implement the SubscribeNet® service of Intraware, Inc., which has been in commercial use for some time.

Broadly, the ESDM system 120 includes a web server 106, FTP server 108, library 110, and shared database 112. The library 110 contains many different stored digital objects such as software, data constructs, or other machine readable digital objects. The library 110 comprises some or all of one or more data storage devices, machines, physical or logical storage constructs, etc. In the illustrated example, contents of the library 110 include software programs, updates, revisions, and the like. For instance, a third party software producer may contract with the entity operating the ESDM system 120 to provide authorized users with access to the third party's software.

The shared database 112 comprises a hardware and/or software construct, some or all of one or more physical or logical digital data storage devices, etc. Although the term "database" is used for convenience and without any intended limitation, the database 112 may be implemented by a relational database, file system, linked list, table, directory server (e.g., LDAP), Windows domain controller, or other suitable construct. The database 112 is referred to as "shared" because it is shared between the web server 106 and the FTP server 108.

The database 112 contains various metadata relating to operation of the web server 106 and FTP server 108. As illustrated, the database 112 includes web server access codes 112a, comprising a list of recognized users (for example by user ID) and password or other login information required to utilize to the web server 106's web site. The database 112 also contains a mapping 112b of which users are authorized to access which of the stored digital objects contained in the library 110. Depending upon user activity at any time, the database 112 may also contain various temporary FTP access codes, generated by the web server 106 for users to utilize in logging in to the FTP server 108. The content and use of the subcomponents 112a-112c are discussed in greater detail below.

FIG. 6 provides a more detailed example showing how the FTP access codes 112c and mapping 112b may be stored and organized. Each database entry includes various components 602-620. In this example, each database entry is identified by a unique key 602. This unique key 602 is also used as the basis for generating FTP user IDs, which (along with a password) constitute a component of the FTP access code. Each entry, in this example, concerns a single file in the library 110; this file is identified by code 604 and file name 606. The database entry's creation time is indicated in 608. The expiration time of the associated file's FTP access code is indicated by 610. Field 612 identifies the user and field 614 identifies the user's organization or account. Field 616 indicates, to the FTP server, whether or not digital objects are to be provided to the user 612 in encrypted form. Field 618 relates the entry to a valid entitlement record. Field 620 contains the user's FTP password, the second component (along with user ID) of the user's FTP access code.

Returning to FIG. 1, the web server 106 may be implemented by a variety of known machines, such as computer workstations, personal computers, etc. The web server 106 performs jobs such as presenting a web page providing instructions for users seeking access to digital objects in the library, authenticating users according to the web server access codes 112a, generating temporary FTP access codes for authenticated users' use at the FTP server 108, and redirecting authenticated users to the FTP server 108.

The FTP server 108 comprises some or all of one or more digital data storage machines, such as a UNIX, Linux, Microsoft NT, Microsoft Windows, or other machine implementing FTP. As is common with FTP, the server 108 requires users to complete some type of authentication as a prerequisite to receiving files from the server 108 via FTP; such authentication is often conducted at the level of the operating system. The FTP server 108 performs task such as authenticating users according to temporary FTP access codes and, upon successful authentication, making digital objects from the library 110 available to the users pursuant to the mapping. In one example, the FTP server 108 may actually comprise multiple FTP servers coupled to the library 110, where a router or other hardware or software construct distributes incoming requests among the various FTP servers according to load or other criteria.

Exemplary Digital Data Processing Apparatus

Figure 2:
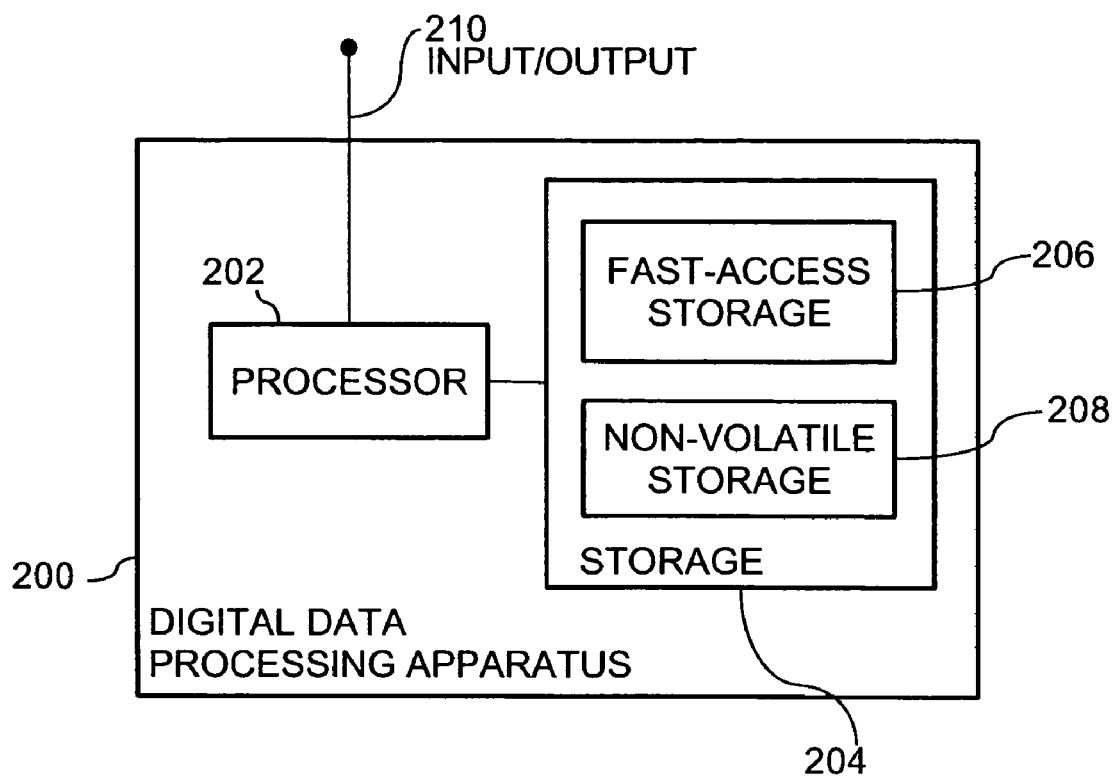
FIG. 2 is a block diagram of an exemplary digital data processing machine.

As mentioned above, data processing entities such as the web server 106, FTP server 108, library 110, and the like may be implemented in various forms. One example is a digital data processing apparatus, as exemplified by the hardware components and interconnections of the digital data processing apparatus 200 of FIG. 2.

The apparatus 200 includes a processor 202, such as a microprocessor, personal computer, workstation, controller, microcontroller, state machine, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, flash PROM, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement processing entities such as the web server 106, FTP server 108, etc. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Operation

Having described the structural features of the present invention, the operational aspect of the invention will now be described.

Signal-Bearing Media

Figure 3:
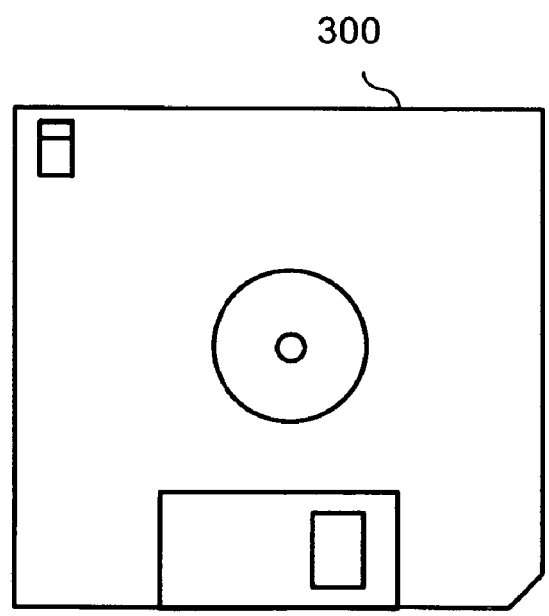
FIG. 3 shows an exemplary signal-bearing medium.

Wherever functionality of a component is implemented using one or more machine-executed program sequences, these sequences may be embodied in various forms of signal-bearing media. In the context of FIG. 3, such a signal-bearing media may comprise, for example, the storage 204 or another signal-bearing media, such as a magnetic data storage diskette 300 (FIG. 3), directly or indirectly accessible by a processor 202. Whether contained in the storage 206, diskette 300, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, flash PROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the invention, the machine-readable instructions may comprise software object code, compiled from a language such as assembly language, C, etc.

Logic Circuitry

In contrast to the signal-bearing medium discussed above, some or all of the invention's functionality may be implemented using logic circuitry, instead of using a processor to execute instructions. Such logic circuitry is therefore configured to perform operations to carry out the method of the invention. The logic circuitry may be implemented using many different types of circuitry, as discussed above.

Overall Sequence of Operation

FIG. 4 shows a sequence 400 to illustrate one example of the method aspect of the present invention. Broadly, this sequence serves to provide a web-accessible digital object storage and delivery system that initially authenticates users seeking access to objects in a library, and further automatically generates temporary FTP access codes to streamline users' access to desired objects via an FTP server. In the following description of the sequence 400, reference is also made to the data flow diagram of FIG. 5. For ease of explanation, but without any intended limitation, the examples of FIGS. 4-5 are described in the context of the environment 100 (FIG. 1) as described above.

The sequence 400 includes setup 402 and run 410 steps. In setup 402, technicians populate 404 the library 110 with a number of machine readable digital objects. Optionally, this step may be conducted on an ongoing basis 405, as the library 110 is repeatedly replenished with new software objects, revisions, patches, and other objects as they become available. In step 406, technicians configure the database, and more particularly, store the following in the database 112: the web server access codes 112a and the mapping 12b. In step 408, technicians program, activate, boot, install, manufacture, load, active, or otherwise configure the web server 106 and FTP server 108 for operation.

After the ESDM system 120 is set up, it runs in step 410. Step 410 is performed repeatedly for different users seeking access to different digital objects. For ease of discussion, however, the run task 410 is discussed in the context of a single user 102 seeking access to one or more digital objects in the library 110. In step 412, the web server 106 utilizes the web server access codes 112a to authenticate a user seeking access to the web server's web site (the "current user"). The web server 106 may condition the user's mere browsing of the web server's web site upon the user's successful login, or the web server may provide limited information to anonymous users in which case authentication is triggered by the user selecting a particular login window, page, frame, applet, or other login feature of the web site.

A more detailed example of step 412 is illustrated in FIG. 5. Namely, the user 102 (column 502) submits a login request with a user ID and password to the web server 106 (column 504), in the form of an HTTPS message 512. The web server 106 queries 514 the database 112 (column 506), and sets a session cookie at the user's browser with a return HTTPS message 516. The session cookie allows the user's browser to access the web server's web page and navigate to authorized files until a timeout occurs in communication 518, the web server also stores various session information in the database 112 (column 506).

Returning to FIG. 4, and after (successful) authentication of step 412, the web server 106 in step 414 provides the user with a list or other depiction of the digital objects that the user is authorized to receive. The web server 106 prepares this list with the aid of the mapping 112b. Later, but also in step 414, the web server 106 receives a request from the now-authenticated user to download one or more of these objects. For example, the user may click on a desired digital object that is depicted in hyperlink form on the user's browser.

Only if the user is authorized to receive the requested object, the web server proceeds to step 416. In 416, the web server generates a temporary FTP access code, stores it in the database 112 (at 112c), and transmits it to the user. The FTP access code, in the example of FIG. 6, comprises a user ID and password. In one example, the FTP access code may be generated by symmetric key encryption. This makes it more difficult for a malicious user to gain unauthorized access by trying repeated login/password combinations. In a different embodiment, the web server may use public key encryption to ensure that the temporary FTP access code could only have been generated by a trusted application.

As one example, the temporary FTP access code may be transmitted to the user in the form of an FTP-compatible uniform resource locator (URL) containing an encoded user ID and an encoded password. One example, using the appropriate syntax, is ftp://<encoded-userid>:<encoded-password>@esd.subscribenet.com, where <encoded-userid> represents the encoded user ID, <encoded-password> represents the encoded password, and esd.subscribenet.com is the FTP address of the FTP server 108. In storing the FTP access code in the database 112, the web server also assigns an expiration time to the user's request, for example, by completing the field 610 (FIG. 6). Also in step 416, the web server refers the requesting user to the FTP server 108. Referral may occur, for example, by providing the user with the FTP server 108's Internet address, automatically redirecting the connection with the user to the FTP server 108, etc. In the present example, the user is directed to the FTP server's Internet address by providing the FTP-compatible URL, discussed above.

A more detailed example of steps 414, 416 is illustrated in FIG. 5. Namely, the user (column 502) sends the web server (column 504) a request to download one or more files using an HTTPS message 520. The web server queries the database to verify enrollment using a communication 522. If enrollment is verified, the web server creates 524 an encrypted FTP URL with a temporary login and transmits it to the user using an HTTPS message 526. The web server also stores the temporary login information in the database as shown by 528.

Returning to FIG. 4, and following step 416, after the user is referred to the FTP server 108, the user attempts to log into the FTP server 108 in step 418 using the FTP access codes obtained from the web server 106 in step 416. In the illustrated example, the user's browser utilizes the same encoded user ID and password received from the web server 106 in step 416. Then, the FTP server 108 consults the temporary FTP access codes 112*c*, and in particular, the access code corresponding to the current user in order to authenticate 418 that user. In the present example, the FTP server 108 unencodes the encoded user ID and password submitted by the user, and compares these to the unencoded FTP access codes stored in 112*c*. The FTP server 108 also considers whether the user's temporary FTP access code has expired, according to the database 112. Also in step 418, the FTP server 108 consults the mapping 112*b* to determine whether that user is permitted to access the desired object. The user is only permitted to access the requested object if the user has submitted a valid and unexpired FTP access code, and the requested object is authorized according to the mapping 112*b*. The user's access, for example, may occur by the FTP server transmitting the object to the user (push), making the object available for download by the user (pull), or another means.

A more detailed example of steps 418, 420 is shown by FIG. 5. In particular, the user uses temporary login information to log into the FTP server (column 508), as shown by HTTPS communication 530. The FTP server decrypts the login ID at 532. The FTP server then validates the login ID and confirms that the user is authorized to access the requested file by querying (534) the database. Assuming that validation and authorization succeed, the FTP server makes the requested file available to the requesting user. Namely, the FTP server retrieves (536) the file from the library (column 510) and sends it (538) to the user.

Returning to FIG. 4, and particularly following step 420, the temporary FTP access code expires in step 422. This may be triggered by arrival of a given time or date, a prescribed number of times the user accesses the web site or FTP server, occurrence of a prescribed volume of data transfer, or other event. In the illustrated example, the each temporary FTP access code automatically expires at a prescribed time, indicated by the expiration date/timestamp (610, FIG. 6) in the database 112.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To illustrate one exemplary embodiment, various functional aspects of the invention have been described in terns of illustrative components, blocks, modules, circuit, and steps. Whether such functionality is implemented as hardware, software, or both depends upon the particular application and design constraints imposed on the overall system. Skilled artisans may implement the described functionality in varying ways for each particular application without such implementation decisions departing from the scope of the present invention.

What is claimed is:

1. A method for setup of a digital object storage and delivery system comprising a library, a shared database, a file transfer protocol (FTP) server coupled to the library and the database, and a web server coupled to the database, the method comprising operations of:

populating the library with a number of machine readable digital objects;

configuring the database to include web server access codes corresponding to various users and a mapping of which of said users are authorized to conduct FTP download of which digital objects contained in the library;

programming the web server to perform operations including presenting at least one Internet web page providing instructions for users seeking to conduct FTP download of to digital objects in the library, authenticating users browsing the web page according to their corresponding web server access codes, generating a temporary FTP access code for each authenticated user, transmitting each temporary FTP access code to the user for which the code was generated, and redirecting each authenticated user to the FTP server;

programming the FTP server to perform operations comprising re-authenticating said redirected users by requiring correct submission of the temporary FTP access codes, only upon successful re-authentication, making digital objects from the library available for FTP download by said users as authorized by the mapping.

2. The method of claim 1, where: the operation of programming the web server further comprises programming the web server to transmit each said temporary FTP code to the database for storage in association with the user for which the temporary FTP code was generated;

the operation of programming the FTP server is conducted such that the FTP server is programmed to perform the re-authenticating operation by comparing temporary FTP access codes submitted by users with temporary FTP access codes stored in the database in association with those users.

3. The method of claim 1, where:

the operation of programming the web server is conducted such that the operation of redirecting each authenticated user to the FTP server is conditioned on the web server performing operations including (1) receiving the user's request to conduct FTP download of one or more particular digital objects in the library and (2) verifying that the user is authorized to conduct FTP download of the particular objects according to the mapping.

4. A method for providing a data storage and delivery system comprising a web server, a file transfer protocol (FTP) server, a shared database coupled to the web server and the FTP server, and a library coupled to the FTP server, the method comprising operations of:

populating the library with a number of machine readable digital objects;

configuring the database to include mapping specifying which of various users are permitted to conduct FTP download of which digital objects contained in the library, and system login information for each user;

programming the web server to perform operations comprising:

utilizing the system login information in the database to authenticate users seeking to conduct FTP download of objects from the library;

responsive to each time the web server receives a web-server-authenticated user's request to conduct FTP download of one or more desired objects from the library, consulting the mapping to determine whether that user is permitted to conduct FTP download of the desired object, and only if that user is permitted to conduct FTP download of the desired object, performing FTP setup operations comprising:

generating an FTP access code associated with the requesting user;

storing the FTP access code in the database;

transmitting the FTP access code to the requesting user;

referring the requesting user to the FTP server;

programming the FTP server to perform operations comprising:

responsive to each time the FTP server receives a web-server- authenticated user's request to conduct FTP download of one or more desired objects from the library, utilizing the requesting user's associated FTP access code stored in the database to authenticate the request and consulting the mapping to determine whether the requesting user is permitted to conduct FTP download of the desired objects;

only if the requesting user is permitted to conduct FTP download of the desired objects, making the desired objects available for FTP download by the requesting user.

5. The method of claim 4, where the operation of programming the web server is conducted such that the operation of transmitting the FTP access code to the requesting user comprises:

the web server sending the requesting user an FTP uniform resource locator (URL) including an encrypted login ID and an encrypted password and an address of the FTP server.

6. The method of claim 4, where the operations of programming the web server are conducted such that:

the operations further include programming the web server to communicate with users via users' respective web browsers;

the operation of the web server transmitting the FTP access code to the requesting user comprises transmitting an encrypted representation of the FTP access code to the requesting user's web browser.

7. The method of claim 4, further comprising programming at least one of the web server and the FTP server to perform operations comprising:

designating and enforcing expiration of each FTP access code.

8. The method of claim 4, where:

the operation of programming the web server is conducted such that the FTP setup operations further comprise designating an expiration event for each FTP access code;

the operation of programming the FTP server is conducted such that the operation of utilizing the FTP access code to authenticate the request further comprises determining whether that FTP access code has expired.

9. A method for operating a digital object storage and delivery system comprising a library of stored machine readable digital objects, a shared database containing web server access codes corresponding to various users and a mapping indicating which users are authorized to conduct FTP download of which of the stored digital objects, a file transfer protocol (FTP) server coupled to the database and the library, and a web server coupled to the database, comprising:

operating the web server to perform operations including presenting at least one Internet web page providing instructions for users seeking to conduct FTP download of digital objects from the library, authenticating users browsing the web page according to their corresponding web server access codes, generating a temporary FTP access code for each authenticated user, transmitting each temporary FTP access code to the user for which the code was cogenerated, and redirecting authenticated users to the FTP server;

operating the FTP server to perform operations comprising re-authenticating said redirected users by utilizing the temporary FTP access codes and, only upon successful authentication, making digital objects from the library available for FTP download by said users as authorized by the mapping.

10. The method of claim 9, where:

the operations performed by the web server further comprise transmitting each said temporary FTP code to the database for storage in association with the user for which the temporary FTP code was generated:

the re-authenticating operation performed by the FTP server further comprises comparing temporary FTP access codes submitted by users with temporary FTP access codes stored in the database in association with those users.

11. The method of claim 9, where:
the operation of the web server redirecting each authenticated user to the FTP server is conditioned on the web server performing operations including (1) receiving the user's request to conduct FTP download of one or more particular digital objects in the library and (2) verifying that the user is authorized to conduct FTP download of the particular objects according to the mapping.

12. A method for selectively delivering stored data utilizing a data storage and delivery system comprising a library populated with a number of machine readable digital objects, a web server, a file transfer protocol (FTP) server coupled to the library, a shared database coupled to the web server and the FTP server containing mapping specifying which of various users are permitted to conduct FTP download of which digital objects in the library and also containing system login information for each user, the method comprising operations of:
the web server utilizing the system login information in the database to authenticate users seeking access to the library;
responsive to each time the web server receives a web-server-authenticated user's request to conduct FTP download of one or more desired objects in the library, the web server consulting the mapping to determine whether that user is permitted to conduct FTP download of the desired object, and only if that user is permitted to conduct FTP download of the desired object, the web server performing FTP setup operations comprising:
generating an FTP access code associated with the requesting user;
storing the FTP access code in the database;
transmitting the temporary FTP access code to the requesting user;
referring the requesting user to the FTP server;
responsive to each time the FTP server receives a web-server-authenticated user's request to conduct FTP download of access one or more desired objects in the library, the FTP server utilizing the requesting user's associated FTP access code stored in the database to authenticate the request and consulting the mapping to determine whether the requesting user is permitted to conduct FTP download of access the desired objects;
only if the request is authenticated and the requesting user is permitted to conduct FTP download of the desired objects, making the desired objects available for FTP download by the requesting user.

13. The method of claim 12, the operation of transmitting the FTP access code to the requesting user comprising:
the web server sending the requesting user an FTP uniform resource locator (URL) including an encrypted login ID and an encrypted password and an address of the FTP server.

14. The method of claim 12, where:
the web server communicates with users via users' respective web browsers;
the operation of the web server transmitting the FTP access code to the requesting user comprises transmitting an encrypted representation of the FTP access code to the requesting user's web browser.

15. The method of claim 12, the operations further comprising:
designating and enforcing expiration of each FTP access code.

16. The method of claim 12, where:
the FTP setup operations further comprise designating an expiration event for each FTP access code;

the operations of the FTP server utilizing the FTP access code to authenticate the request further comprises determining whether that FTP access code has expired.

17. An electronic software delivery and management (ESDM) system, comprising:
a library of stored machine readable digital objects;
a shared database containing web server access codes corresponding to various users and a mapping indicating which of said users are authorized to conduct FTP download of which of the stored digital objects;
a file transfer protocol (FTP) server coupled to the database and the library;
a web server coupled to the database and programmed to perform operations including presenting at least one Internet web page providing instructions for users seeking to conduct FTP download of digital objects in from the library, authenticating said users browsing the web page according to their corresponding web server access codes, generating a temporary FTP access code for each authenticated user, transmitting each temporary FTP access code to the user for which the code was generated, and redirecting each authenticated user to the FTP server;
the FTP server programmed to perform operations comprising re-authenticating said redirected users by requiring correct submission of the temporary FTP access codes and, only upon successful authentication, making digital objects from the library available for FTP download by said users as authorized by the mapping.

18. The system of claim 17, where:
the web server is further programmed to perform operations including transmitting each said temporary FTP code to the database for storage in association with the user for which the temporary FTP code was generated;
the FTP server is programmed such that the re-authenticating operation further comprises comparing temporary FTP access codes submitted by users with temporary FTP access codes stored in the database in association with those users.

19. The system of claim 17, where:
the operation of the web server redirecting each authenticated user to the FTP server is conditioned on the web server performing operations including (1) receiving the user's request to conduct FTP download of one or more particular digital objects in the library and (2) verifying that the user is authorized to conduct FTP download of the particular objects according to the mapping.

20. An electronic software delivery and management (ESDM) system, comprising:
library means for storing machine readable digital objects;
shared database means for containing web server access codes corresponding to various users and a mapping indicating which of said users are authorized to conduct FTP download of which of the stored digital objects;
web server means, coupled to the database means, for performing operations including presenting at least one Internet web page providing instructions for users seeking to conduct FTP download of digital objects from the library means, authenticating users browsing the web page according to their corresponding web server access codes, generating a temporary file transfer protocol (FTP) access code for each authenticated user, transmitting each temporary FTP access code to the user for which the code was cogenerated. and redirecting authenticated users to an FTP server means;
FTP server means, coupled to the database means and the library means, for performing operations comprising re-authenticating said redirected users by requiring correct submission of the temporary FTP access codes and, only upon successful authentication, making digital objects from the library means available for FTP download by said users as authorized by the mapping.

21. A data storage and delivery system for selectively delivering stored data, comprising:

a library of stored machine readable digital objects;

a web server;

a file transfer protocol (FTP) server coupled to the library;

a shared database coupled to the web server and the FTP server, containing mapping specifying which of various users are permitted to conduct FTP download of which digital objects in the library and also containing system login information for each user;

the web server being programmed to perform operations comprising:

utilizing the system login information in the database to authenticate users seeking to conduct FTP download of objects from the library;

responsive to each time the web server receives a web-server- authenticated user's request to conduct FTP download of one or more desired objects from the library, consulting the mapping to determine whether that user is permitted to conduct FTP download of the desired object, and only if that user is permitted to conduct FTP download of the desired object, performing FTP setup operations comprising:

generating an FTP access code associated with the requesting user;

storing the FTP access code in the database;

transmitting the FTP access code to the requesting user;

referring the requesting user to the FTP server;

the FTP server being programmed to perform operations comprising:

responsive to each time the FTP server receives a web-server- authenticated user's request to conduct FTP download of one or more desired objects from the library, utilizing the requesting user's associated FTP access code stored in the database to authenticate the request and consulting the mapping to determine whether the requesting user is permitted to conduct FTP download of the desired objects;

only if the request is authenticated and the requesting user is permitted to conduct FTP download of the desired objects, making the desired objects available for FTP download by to the requesting user.

22. The system of claim 21, the web server programmed such that the operation of transmitting the FTP access code to the requesting user comprises:

the web server sending the requesting user an FTP uniform resource locator (URL) including an encrypted login ID and an encrypted password and an address of the FTP server.

23. The system of claim 21, where:

the web server is programmed to communicate with users via users' respective web browsers;

the web server is programmed such that the operation of transmitting the FTP access code to the requesting user comprises transmitting an encrypted representation of the FTP access code to the requesting user's web browser.

24. The system of claim 21, the FTP server further programmed to perform operations comprising:

enforcing a designated expiration for each FTP access code.

25. The system of claim 21, where:

the web server is programmed such that the FTP setup operations further comprise designating an expiration event for each FTP access code;

the FTP server is programmed such that the operation of utilizing the FTP access code to authenticate the request further comprises determining whether that FTP access code has expired.

* * * * *